(12) United States Patent
Lee et al.

(10) Patent No.: US 6,927,814 B2
(45) Date of Patent: Aug. 9, 2005

(54) ARRAY SUBSTRATE FOR LCD AND METHOD OF FABRICATING THE SAME

(75) Inventors: Dong-Hoon Lee, Gyeonggi (KR); Min-joo Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 42 days.

(21) Appl. No.: 10/735,770

(22) Filed: Dec. 16, 2003

(65) Prior Publication Data

US 2004/0125261 A1 Jul. 1, 2004

(30) Foreign Application Priority Data

Dec. 17, 2002 (KR) .............................. 10-2002-0080881

(51) Int. Cl.$^7$ ..................... G02F 1/1335; G02F 1/136
(52) U.S. Cl. ........................ 349/106; 349/43; 349/47
(58) Field of Search ............................ 349/43, 47, 106, 349/108

(56) References Cited

U.S. PATENT DOCUMENTS 6,191,835 B1 * 2/2001 Choi .......................... 349/106
6,222,600 B1 * 4/2001 Hirano ........................ 349/113

* cited by examiner

*Primary Examiner*—Robert H. Kim
*Assistant Examiner*—Phu Vu
(74) *Attorney, Agent, or Firm*—Birch, Stewart, Kolasch & Birch, LLP

(57) ABSTRACT

An array substrate for a liquid crystal display, which includes a data line in a first direction; a gate line in a second direction perpendicular to the data line, wherein the data and gate lines cross to each other to define a pixel region; a thin film transistor disposed near a crossing of the data and gate lines, the thin film transistor comprising source, gate and drain electrodes; a black matrix over the thin film transistor and on the data line, the black matrix exposing a portion of the drain electrode; a color filter disposed within the pixel region, the color filter covering a portion of the drain electrode with exposing another portion of the drain electrode; and a pixel electrode on the color filter within a pixel region, the pixel electrode contacting an exposed portion of the drain electrode.

30 Claims, 19 Drawing Sheets

ARRAY SUBSTRATE FOR LCD AND METHOD OF FABRICATING THE SAME

This application claims the benefit of the Korean Application No. P2002-0080881 filed on Dec. 17, 2002, which is hereby incorporated by reference.

BACKGROUND OF THE INVENTION

1. Field of the Invention

The invention relates to a liquid crystal display device, and more particularly, to an array substrate having a color filter on a thin film transistor structure that is suitable for a wide scope of applications, particularly for increasing the aperture ratio and simplifying the fabrication process.

2. Discussion of the Related Art

In general, flat panel display devices have been used for portable display devices because they are thin, light weight, and have low power consumption. Among the various types of flat panel display devices, liquid crystal display (LCD) devices find wide use for laptop computers and desktop computer monitors because of their superior resolution, color image display, and display quality.

Optical anisotropy and the polarization characteristics of liquid crystal molecules are utilized to generate desirable images. Liquid crystal molecules have specific alignment directions that result from their own anisotropic characteristics. The specific alignment directions can be modified by electric fields that are applied to the liquid crystal molecules. In other words, the electric fields applied upon the liquid crystal molecules can change the alignment of the liquid crystal molecules in accordance with their dielectric anisotropy. Due to the liquid crystal's optical anisotropy, the incident light refracts according to the alignment of the liquid crystal molecules.

Specifically, LCD devices include upper and lower substrates having electrodes that are spaced apart and face into each other, and a liquid crystal material is interposed therebetween. Accordingly, when a voltage is applied to the liquid crystal material through the electrodes of each substrate, the alignment direction of the liquid crystal molecules changes in accordance with the applied voltage, thereby displaying images. By controlling the applied voltage, the LCD device provides various light transmittances to display image data.

Liquid crystal display (LCD) devices find wide applications in office automation (OA) and video equipment due to their characteristics such as lightweight, slim design, and low power consumption. Among different types of LCD devices, active matrix LCDs (AM-LCDs) (AM-LCDs) having thin film transistors and pixel electrodes arranged in a matrix form provide high resolution and superiority in displaying moving images. A typical LCD panel has an upper substrate, a lower substrate, and a liquid crystal layer interposed therebetween. The upper substrate (referred to as a color filter substrate) includes a common electrode and color filters. The lower substrate (referred to as an array substrate) includes thin film transistors (TFT's), such as switching elements, and pixel electrodes.

As previously described, an LCD device operates based on the principle that the alignment direction of liquid crystal molecules varies with applied electric fields between the common electrode and the pixel electrode. Accordingly, the liquid crystal molecules function as an optical modulation element having variable optical characteristics that depend upon the polarity and/or magnitude of the applied voltage.

FIG. 1 shows an expanded perspective view illustrating a related art active matrix liquid crystal display device. As shown in FIG. 1, the LCD device 11 includes an upper substrate 5 (referred to as a color filter substrate) and a lower substrate 22 (referred to as an array substrate) having a liquid crystal layer 14 interposed therebetween. On the upper substrate 5, a black matrix 6 and a color filter layer 8 form an array matrix including multiple red (R), green (G), and blue (B) color filters surrounded by the black matrix 6. Additionally, a common electrode 18 formed on the upper substrate 5 covers the color filter layer 8 and the black matrix 6.

On the lower substrate 22, multiple thin film transistors T form an array matrix corresponding to the color filter layer 8. Multiple gate lines 13 and data lines 15 perpendicularly cross one another such that each TFT T is located adjacent to each intersection of the gate lines 13 and the data lines 15. Furthermore, multiple pixel electrodes 17 are formed on a pixel region P defined by the gate lines 13 and the data lines 15 of the lower substrate 22. The pixel electrode 17 is a transparent conductive material having high light transmissivity, such as indium tin oxide (ITO) or indium zinc oxide (IZO).

FIG. 1 also shows a storage capacitor C disposed to correspond to each pixel P and connected in parallel to each pixel electrode 17. The storage capacitor C has a portion of the gate line 13 as a first capacitor electrode, a storage metal layer 30 as a second capacitor electrode, and an interposed insulator (shown as reference numeral 16 of FIG. 2). Since the storage metal layer 30 connects to the pixel electrode 17 through a contact hole, the storage capacitor C electrically contacts the pixel electrode 17.

In the related art LCD device shown in FIG. 1, a scanning signal is applied to the gate electrode of the thin film transistor T through the gate line 13, and a data signal is applied to the source electrode of the thin film transistor T through the data line 15. As a result, the liquid crystal molecules of the liquid crystal material layer 14 align and arrange by the operation of the thin film transistor T, and this operation controls the incident light passing through the liquid crystal layer 14 to display an image. Namely, the electric fields induced between the pixel and common electrodes 17 and 18 re-arrange the liquid crystal molecules of the liquid crystal material layer 14 so that the incident light can be converted into the desired images in accordance with the induced electric fields.

When fabricating the LCD device 11 of FIG. 1, the upper substrate 5 aligns with and attaches to the lower substrate 22. In this process, the upper substrate 5 may misalign with respect to the lower substrate 22, and light leakage may occur in the completed LCD device 11 due to a marginal error in attaching the upper and lower substrates 5 and 22.

FIG. 2 shows a schematic cross-sectional view taken along line II—II of FIG. 1, illustrating a pixel of the related art liquid crystal display device.

As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed therebetween. The upper and lower substrates 5 and 22 are often referred to as a color filter substrate and an array substrate, respectively, because the color filter layer 8 forms upon the upper substrate and multiple array elements are formed on the lower substrate 22.

In FIG. 2, the thin film transistor T is formed on the front surface of the lower substrate 22. The thin film transistor T includes a gate electrode 32, an active layer 34, a source electrode 36, and a drain electrode 38. Between the gate electrode 32 and the active layer 34, a gate insulation layer 16 is interposed to protect the gate electrode 32 and the gate line 13. As shown in FIG. 1, the gate electrode 32 extends from the gate line 13 and the source electrode 36 extends from the data line 15. All of the gate, source, and drain electrodes 32, 36, and 38 are formed of a metallic material while the active layer 34 is formed of silicon. A passivation layer 40 protects the thin film transistor T. In the pixel region P, the transparent and conductive pixel electrode 17 is disposed on the passivation layer 40 and contacts the drain electrode 38 and the storage metal layer 30 through contact holes formed in the passivation layer 40.

Meanwhile, as mentioned above, the gate electrode 13 acts as a first electrode of the storage capacitor C, and the storage metal layer 30 acts as a second electrode of the storage capacitor C. The gate electrode 13 and the storage metal layer 30 thus constitute the storage capacitor C with the interposed gate insulation layer 16.

FIG. 2 also shows the upper substrate 5 being spaced apart from the lower substrate 22 over the thin film transistor T. On the rear surface of the upper substrate 5, a black matrix 6 is disposed in a position corresponding to the thin film transistor T, the gate line 13 and the data line 15. The black matrix 6 covers the entire surface of the upper substrate 5 and has openings corresponding to the pixel electrode 17 of the lower substrate 22, as shown in FIG. 1. The black matrix 6 prevents light leakage in the LCD panel except for the portion for the pixel electrode 17. The black matrix 6 protects the thin film transistor T from the light such that the black matrix 6 prevents generation of a photo-current in the thin film transistor T. The color filter layer 8 is formed on the rear surface of the upper substrate 5 to cover the black matrix 6. Each of the color filters 8 has one of the red 8a, green 8b, and blue 8b colors and corresponds to one pixel region P where the pixel electrode 17 is located. A transparent and conductive common electrode 18 is disposed on the color filter layer 8 over the upper substrate 5.

In the related art LCD panel discussed above, the pixel electrode 17 has a one-to-one correspondence with one of the color filters. Furthermore, in order to prevent cross-talk between the pixel electrode 17 and the gate and data lines 13 and 15, the pixel electrode 17 is spaced apart from the data line 15 by the distance A and from the gate line 13 by the distance B, as shown in FIG. 2. The open spaces A and B between the pixel electrode 17 and the data and gate line 15 and 13 cause a malfunction, such as light leakage, in the LCD device. Namely, the light leakage mainly occurs in the open spaces A and B so that the black matrix 6 formed on the upper substrate 5 should cover the open spaces A and B. However, when the upper substrate 5 is arranged with the lower substrate 22 or vice versa, a misalignment may occur between the upper substrate 5 and the lower substrate 22. The black matrix 6 is therefore extended to completely cover the open spaces A and B. That is, the black matrix 6 has been designed to provide an aligning margin to prevent light leakage. However, extending the black matrix reduces the aperture ratio of the liquid crystal panel by as much as the aligning margin of the black matrix 6. Moreover, if there are errors in the aligning margin of the black matrix 6, light leakage still occurs in the open spaces A and B, and deteriorates the image quality of an LCD device.

To overcome the above-mentioned problems, it is suggested that the black matrix and the color filter be formed over the array substrate where the thin film transistors are already formed. This structure is often referred to as a color filter on a thin film transistor (COT) structure.

FIG. 3 shows a partially enlarged plane view of an array substrate having a related art color filter on a thin film transistor (COT) structure.

As shown in FIG. 3, an array substrate includes multiple gate lines 52 disposed in a transverse direction and multiple data lines 66 disposed in a longitudinal direction. The multiple gate lines 52 and the multiple data lines 66 cross one another and define a pixel region P. A thin film transistor T is formed at each intersection of the gate line 52 and the data line 66. The thin film transistor T includes a gate electrode 54, an active layer 58, a source electrode 62, and a drain electrode 64. In the pixel regions P defined by the gate lines and data lines 52 and 66, multiple color filters 72a, 72b, and 72c are located therein. Additionally, a pixel electrode 80 corresponds to each pixel region P. The pixel electrode 80 is disposed on the color filter 72 and contacts the drain electrode 64. Namely, the color filter 72 has a location underneath the pixel electrode 80, and then the pixel electrode 80 electrically contacts the drain electrode 64 through a contact hole formed in the color filter 72.

Meanwhile, a storage capacitor $C_{st}$ includes a portion of the gate line 52 and a storage metal layer 68. Thus, the portion of the gate line 52 acts as a first electrode of the storage capacitor $C_{st}$, and the storage metal layer 68 acts as a second electrode of the storage capacitor $C_{st}$. The pixel electrode 80 electrically contacts the storage metal layer 68, so that it electrically connects to the storage capacitor $C_{st}$ in parallel.

The array substrate of FIG. 3 has a color filter on a thin film transistor (COT) structure. In such a COT structure, a black matrix 74 and the color filters 72 are formed on a substrate (reference number 50 of FIG. 4A). The black matrix 74 corresponds to the thin film transistors T and the gate lines 52 and the data lines 66, so that it prevents light leakage in the LCD device. An opaque organic material forms the black matrix 74, thereby blocking the light incident to the thin film transistors T. Also, it protects the thin film transistors T from the external impact.

Although FIG. 3 shows the black matrix 74 being disposed over the gate lines 52, the black matrix 74 over the gate lines 52 can be omitted when the color filters 72 neighboring up-and-down pixels have the same color.

FIGS. 4A to 4G show cross-sectional views taken along a line IV—IV of FIG. 3, illustrating the process steps of fabricating the related art array substrate having a color filter on a thin film transistor (COT) structure.

In FIG. 4A, a first metal layer, such as aluminum (Al), aluminum alloy, copper (Cu), tungsten (W), chromium (Cr) or molybdenum (Mo), is deposited on the surface of a substrate 50, and then patterned through a first mask process to form a gate line 52 and a gate electrode 54. Thereafter, a gate insulation layer 56 (a first insulating layer) is formed on the substrate 50 to cover the gate line 52 and the gate electrode 54. An inorganic material, such as silicon nitride ($SiN_x$) or silicon oxide ($SiO_2$), forms the gate insulation layer 56.

Next, FIG. 4B, shows an intrinsic amorphous silicon layer (a-Si:H) and then an $n^+$-doped amorphous silicon layer ($n^+$a-Si:H) that are sequentially deposited on the entire surface of the gate insulation layer 56, and then simultaneously patterned through the second mask process to form an active layer 58 and an ohmic contact layer 60. The active layer 58 is disposed over the gate electrode 54, and the ohmic contact layer 60 is then located on the active layer 58.

FIG. 4C shows that after forming the active layer 58 and the ohmic contact layer 60, a second metal layer is deposited over an entire of the substrate 50, and then patterned through the third mask process to form a source electrode 62, a drain electrode 64, a data line 66, and a storage metal layer 68. The source electrode 62 extends from the data line 66 and contacts one portion of the ohmic contact layer 60. The drain electrode 64 is spaced apart from the source electrode 62 and then contacts the other portion of the ohmic contact layer 60. The storage metal layer 68 overlaps a portion of the gate line 52. Thereafter, a portion of the ohmic contact layer 60 between the source and drain electrodes 62 and 64 is etched by using the source and drain electrodes 62 and 64 as masks, and a thin film transistor T and a storage capacitor $C_{st}$ are complete. As described with reference to FIG. 3, the thin film transistor T includes the gate electrode 54, the active layer 58, the ohmic contact layer 60, the source electrode 62, and the drain electrode 64. Also, the storage capacitor $C_{st}$ includes the gate line 52, the storage metal layer 68, and the interposed first insulator 56.

Thereafter, a second insulating layer 70 is deposited over the entire surface of the substrate 50 to cover the patterned second metal layer. The second insulating layer 70 may be formed of silicon nitride ($SiN_x$) or silicon oxide ($SiO_2$).

FIG. 4D shows a color resin being formed on the second insulating layer 70 and then developed to form color filters 72a, 72b and 72c having red (R), green (G), and blue (B) colors. The color filters 72a, 72b, and 72c for displaying the full spectrum of colors are formed in the pixel regions P. When developing the color resin, the same mask (the fourth mask) is used for each red (R), green (G) and blue (B) color filter.

FIG. 4E shows a photosensitive opaque organic layer being deposited over the color filter layer 72, and then patterned through a fifth mask process to form a black matrix 74 corresponding in position to the thin film transistor T. Although not shown exactly in FIG. 4E, the black matrix is formed to correspond to and overlap the data line 66.

Further, although shown in FIG. 3 but not in FIG. 4E, the black matrix 74 that may be disposed over the gate line 52 can be omitted when the color filters disposed in the up-and-down neighboring pixels have the same color continuously.

FIG. 4F shows a step of forming contact holes through the color filter layer 72 and second insulation layer 70. Portions of the color filter layer 72 and second insulation layer 70 are simultaneously etched out through a sixth mask process to expose the drain electrode 64 and the storage metal layer 68, respectively, thereby forming a drain contact hole 76 to the drain electrode 64 and a storage contact hole 78 to the storage metal layer 68.

FIG. 4G shows a step of forming a pixel electrode 80 on the color filter 72. A transparent conductive layer of indium tin oxide (ITO) or indium zinc oxide (IZO) is deposited over the entire of the substrate 50 to cover the color filters 72 and the black matrix 74. Thereafter, the first transparent conductive layer is patterned through a seventh mask process, thereby forming the pixel electrode 80 on the color filter 72 within the pixel region P. The pixel electrode 80 contacts both the drain electrode 64 and the storage metal layer 68, respectively, through the drain contact hole 76 and the storage contact hole 78.

However, the above-mentioned manufacturing process requires many more steps, for example, those needed for the seventh mask processes, due to the configuration of the thin film transistor and other elements. Therefore, the process time and the product cost increase, and the manufacturing yields decrease.

SUMMARY OF THE INVENTION

Accordingly, the invention is directed to a method for fabricating an array substrate having a color filter on a thin film transistor (COT) structure for a liquid crystal display device that substantially obviates one or more of problems due to limitations and disadvantages of the related art.

An object of the invention is to provide a method for fabricating an array substrate having a COT structure for a liquid crystal display device, which simplifies the manufacturing process and increases the manufacturing yield.

Another object of the invention is to provide an array substrate having a COT structure for a liquid crystal display device, which has improved structure and configuration.

The invention, in part, pertains to an array substrate for use in a liquid crystal display device that includes: a data line over a substrate in a first direction; a gate line over the substrate in a second direction perpendicular to the data line, wherein the data and gate lines cross each other to define a pixel region; a thin film transistor disposed near a crossing of the data and gate lines, the thin film transistor comprising: source and drain electrodes on the substrate; an active layer over the source and drain electrodes; an ohmic contact layer between the active layer and the source electrode and between the active layer and the drain electrode; a gate insulation layer over the active layer; and a gate electrode over the gate insulation layer; a black matrix over the thin film transistor and on the data line, the black matrix exposing a portion of the drain electrode; a color filter disposed over the substrate within the pixel region, the color filter covering a portion of the drain electrode with exposing another portion of the drain electrode; and a pixel electrode over the color filter within a pixel region, the pixel electrode contacting an exposed portion of the drain electrode.

In the invention, the array can include a storage capacitor that includes a storage metal layer, a portion of the gate line, and an insulating pattern interposed between the storage metal layer and the gate line; and doped and pure amorphous silicon patterns between the storage metal layer and the insulating pattern; wherein the pixel electrode electrically contacts a portion of the storage metal layer. Also, the data line, the source electrode, the drain electrode and the storage metal layer can be formed during the same mask process using identical material selected from the group consisting of chromium (Cr), molybdenum (Mo), tungsten (W), titanium (Ti), copper (Cu), aluminum (Al) and an aluminum alloy. Further, the gate insulation layer and the insulating pattern can be formed of identical material selected from the group consisting of silicon nitride, silicon oxide and silicon oxynitride. Additionally, the color filter can have one of red, green or blue colors and has a continuous color formation with next color filters formed in up-and-down directions.

The invention, in part, pertains to an array substrate for a liquid crystal display device that includes: a substrate including a data region, a TFT region, a pixel region and a gate region; a black matrix over the substrate to correspond to the data region and the TFT region; a buffer layer over the substrate to cover the black matrix; a data line on the buffer layer in a first direction, the data line corresponding to the data region; a gate line over the buffer layer to correspond to the gate region in a second direction perpendicular to the data line, wherein the data and gate lines cross each other, thereby defining the pixel region; a thin film transistor disposed over the buffer layer near a crossing of the data and gate lines, the thin film transistor corresponding to the TFT region and comprising: source and drain electrodes over the buffer layer; an active layer over the source and drain electrodes; an ohmic contact layer between the active layer and the source electrode and between the active layer and the drain electrode; a gate insulation layer over the active layer;

and a gate electrode over the gate insulation layer; a color filter disposed over the buffer layer within the pixel region, the color filter covering a portion of the drain electrode while exposing another portion of the drain electrode; and a pixel electrode on the color filter within a pixel region, the pixel electrode contacting an exposed portion of the drain electrode.

In the invention, the array can include a storage capacitor that includes a storage metal layer, a portion of the gate line, and an insulating pattern interposed between the storage metal layer and the gate line; and doped and pure amorphous silicon patterns between the storage metal layer and the insulating pattern; wherein the pixel electrode electrically contacts a portion of the storage metal layer. Also, the data line, the source electrode, the drain electrode and the storage metal layer an be formed in the same mask process using identical material selected from the group consisting of chromium (Cr), molybdenum (Mo), tungsten (W), titanium (Ti), copper (Cu), aluminum (Al) and an aluminum alloy. Further, the gate insulation layer and the insulating pattern can be formed of identical material selected from the group consisting of silicon nitride, silicon oxide and silicon oxynitride. The color filter has one of red, green or blue colors and has a continuous color formation with next color filters formed in up-and-down directions.

The invention, in part, pertains to a liquid crystal display device that includes: first and second substrates spaced apart from each other; a data line over the first substrate in a first direction; a gate line over the first substrate in a second direction perpendicular to the data line, wherein the data and gate lines cross to each other to define a pixel region; a thin film transistor disposed over the first substrate near a crossing of the data and gate lines, the thin film transistor comprising: source and drain electrodes over the first substrate; an active layer over the source and drain electrodes; an ohmic contact layer between the active layer and the source electrode and between the active layer and the drain electrode; a gate insulation layer over the active layer; and a gate electrode over the gate insulation layer; a color filter disposed over the first substrate within the pixel region, the color filter covering a portion of the drain electrode with exposing another portion of the drain electrode; a pixel electrode over the color filter within the pixel region, the pixel electrode contacting an exposed portion of the drain electrode; a black matrix over the second substrate, the black matrix corresponding to both the data line and the thin film transistor; and a common electrode over an entire of the second substrate to cover the black matrix.

The invention, in part, pertain to a method of fabricating an array substrate for use in a liquid crystal display device includes: forming a first metal layer and a doped amorphous silicon layer in series over a substrate; patterning the first metal layer and the doped amorphous silicon layer simultaneously to form a data line, a source electrode and a drain electrode; forming a pure amorphous silicon layer, an insulating layer and a second metal layer in series over the substrate to cover the data line, the source electrode and the drain electrode; patterning the pure amorphous silicon layer, the insulating layer and the second metal layer simultaneously to form an active layer, a gate insulation layer, a gate electrode and a gate line, thereby forming a thin film transistor including the source and drain electrode, the active layer and the gate electrode, wherein the gate line perpendicularly crosses the data line to form a pixel region; forming a black matrix over the thin film transistor and over the data line, except for a portion of the drain electrode; forming a color filter over the substrate within the pixel region, the color filter covering a portion of the drain electrode while exposing another portion of the drain electrode; and forming a pixel electrode over the color filter within a pixel region, the pixel electrode contacting an exposed portion of the drain electrode.

In the invention, patterning the first metal layer and the doped amorphous silicon layer can form a storage metal layer over the substrate. Patterning the pure amorphous silicon layer, the insulating layer and the second metal layer can form a doped amorphous silicon pattern, a pure amorphous silicon pattern and an insulating pattern in series between the storage metal layer and the gate line. Also, the storage metal layer, a portion of the gate line and the insulation pattern can be a storage capacitor, and the pixel electrode can electrically contact a portion of the storage metal layer. The first metal layer can be at least one metallic material selected from the group consisting of chromium (Cr), molybdenum (Mo), tungsten (W), titanium (Ti), copper (Cu), aluminum (Al) and an aluminum alloy. The insulation can be at least one material selected from the group consisting of silicon nitride, silicon oxide and silicon oxynitride. Further, the color filter has one of red, green or blue colors and has a continuous color formation with next color filters formed in up-and-down directions. Also, the black matrix can be a photosensitive black resin.

The invention, in part, pertains to a method of fabricating an array substrate for a liquid crystal display device that includes: defining a data region, a TFT region, a pixel region and a gate region in a substrate; forming a black matrix over the substrate to correspond to both the data region and the TFT region; forming a buffer layer over the substrate to cover the black matrix; forming a data line over the buffer layer in a first direction, the data line corresponding to the data region; forming a gate line over the buffer layer to correspond to the gate region in a second direction perpendicular to the data line, wherein the data and gate lines cross each other, thereby defining the pixel region; forming a thin film transistor over the buffer layer near a crossing of the data and gate lines, the thin film transistor corresponding to the TFT region and comprising: source and drain electrodes over the buffer layer; an active layer over the source and drain electrodes; an ohmic contact layer between the active layer and the source electrode and between the active layer and the drain electrode; a gate insulation layer over the active layer; and a gate electrode over the gate insulation layer; forming a color filter over the buffer layer within the pixel region, the color filter covering a portion of the drain electrode while exposing another portion of the drain electrode; and forming a pixel electrode on the color filter within a pixel region, the pixel electrode contacting an exposed portion of the drain electrode.

In the invention, the method can include forming a storage capacitor that includes a storage metal layer, a portion of the gate line, and an insulating pattern interposed between the storage metal layer and the gate line. The pixel electrode can electrically contact a portion of the storage metal layer. Doped and pure amorphous silicon patterns can be between the storage metal layer and the insulating pattern. Also, the data line, the source electrode, the drain electrode and the storage metal layer can be formed in the same mask process using identical material selected from the group consisting of chromium (Cr), molybdenum (Mo), tungsten (W), titanium (Ti), copper (Cu), aluminum (Al) and an aluminum alloy. Further, the gate insulation layer and the insulating pattern can be formed of identical material selected from the group consisting of silicon nitride, silicon oxide and silicon oxynitride. The color filter can be one of red, green or blue colors and have a continuous color formation with next color filters formed in up-and-down directions. Additionally, the buffer layer can one of benzocyclobutene (BCB), acrylic resin, methacrylic resin, silicon nitride, silicon oxide or silicon oxynitride. The black matrix can be one of a single layer of chromium or a double layer of chromium and chromium oxide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION

Reference will now be made in detail to the illustrated embodiments of the invention, examples of which are illustrated in the accompanying drawings. Wherever possible, the same reference numbers will be used throughout the drawings to refer to the same or like parts.

Figure 5:
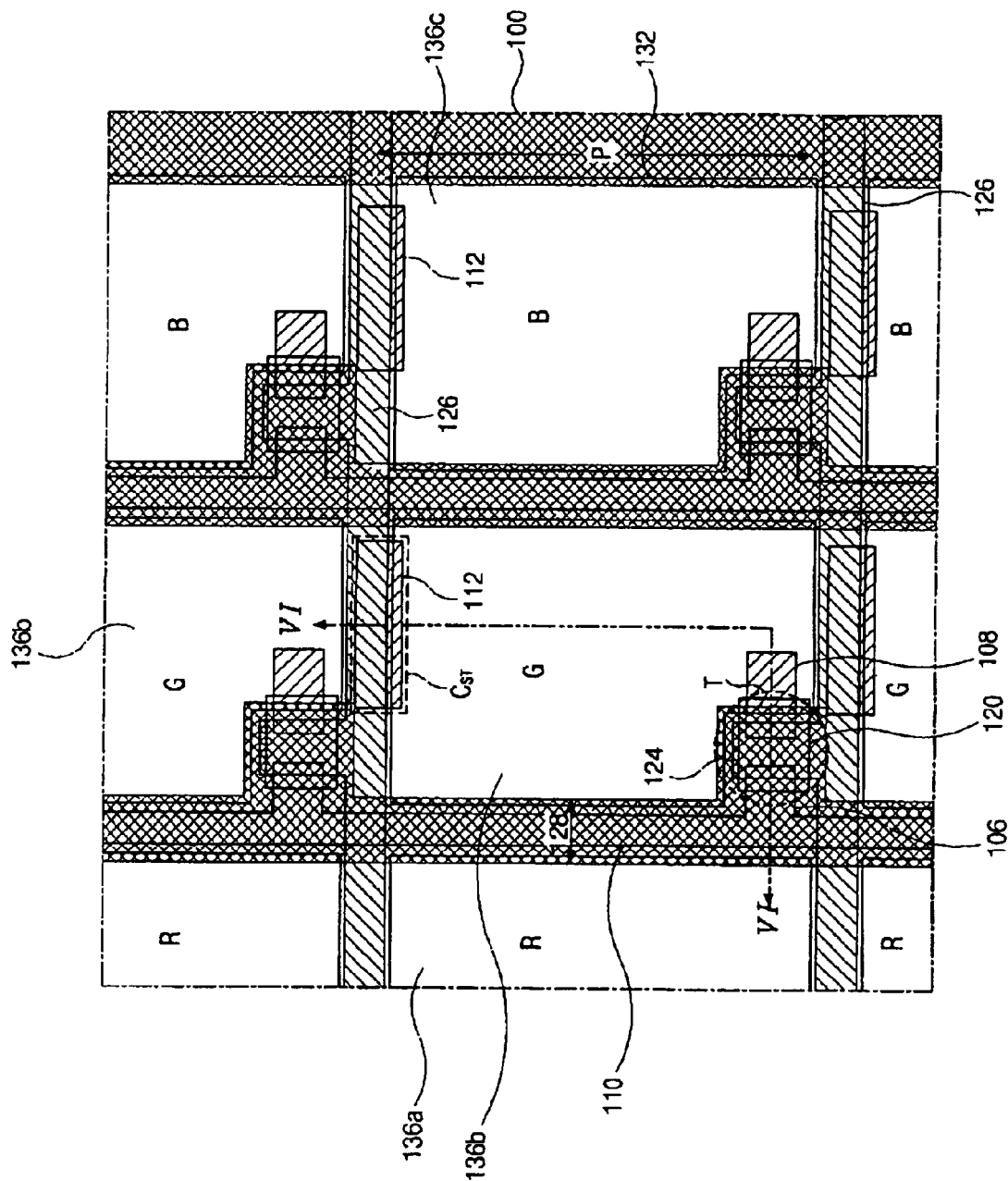
FIG. 5 shows a partially enlarged plane view of an array substrate having a color filter on a thin film transistor structure according to a first embodiment of the invention.

FIG. 5 shows a partially enlarged plane view of an array substrate having a color filter on a thin film transistor structure according to a first embodiment of the invention. As shown in FIG. 5, an array substrate includes multiple data lines 110 disposed in a longitudinal direction and multiple gate lines 126 disposed in a transverse direction. The multiple data lines 110 and the multiple gate lines 126 cross one another and define a pixel region P. A thin film transistor T is formed at each intersection of the data line 110 and the gate line 126.

The thin film transistor T includes a source electrode 106, a drain electrode 108, an active layer 120, and a gate electrode 124. The inventive thin film transistor T is a top gate type or a normal stagger type having the gate electrode 124 on the active layer 120 and over the source and drain electrodes 106 and 108. In the pixel regions P defined by the data lines and gate lines 110 and 126, multiple color filters 136a, 136b and 136c are located therein. Additionally, a pixel electrode 132 is also formed on the color filter 136 within the pixel region P.

Meanwhile, a portion of the gate line 126 and a storage metal layer 112 includes a storage capacitor $C_{ST}$. Thus, the portion of the storage metal layer 112 acts as a first electrode of the storage capacitor $C_{ST}$, and the gate electrode 126 acts as a second electrode of the storage capacitor $C_{ST}$. The pixel electrode 132 electrically contacts the storage metal layer 112, so that the pixel electrode 132 electrically connects parallel to the storage capacitor $C_{ST}$. The storage metal layer 112 is formed of the same material as the data line 110 during the same process step.

Figure 1:
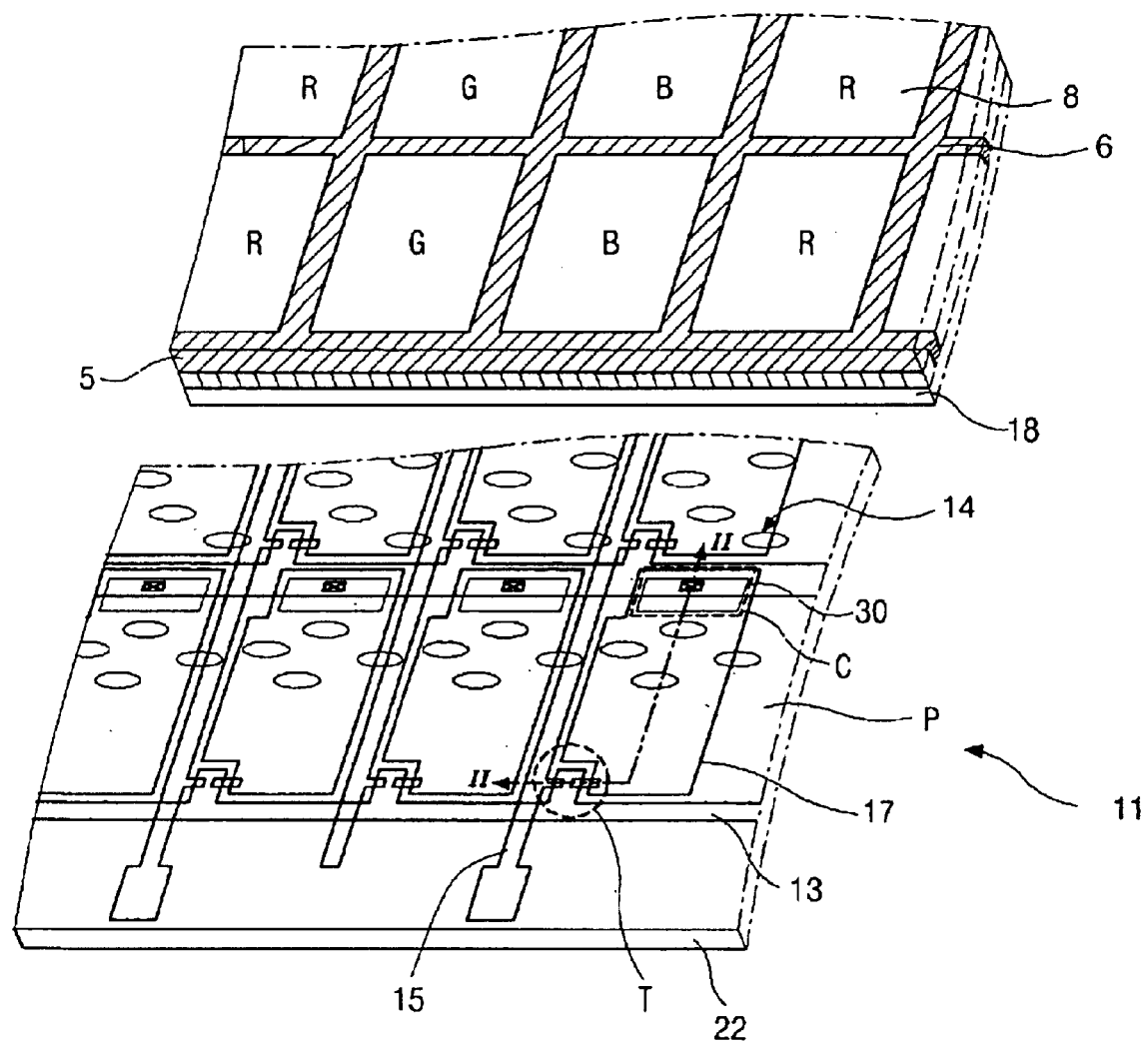
FIG. 1 shows an expanded perspective view illustrating a related art liquid crystal display device.
Figure 2:
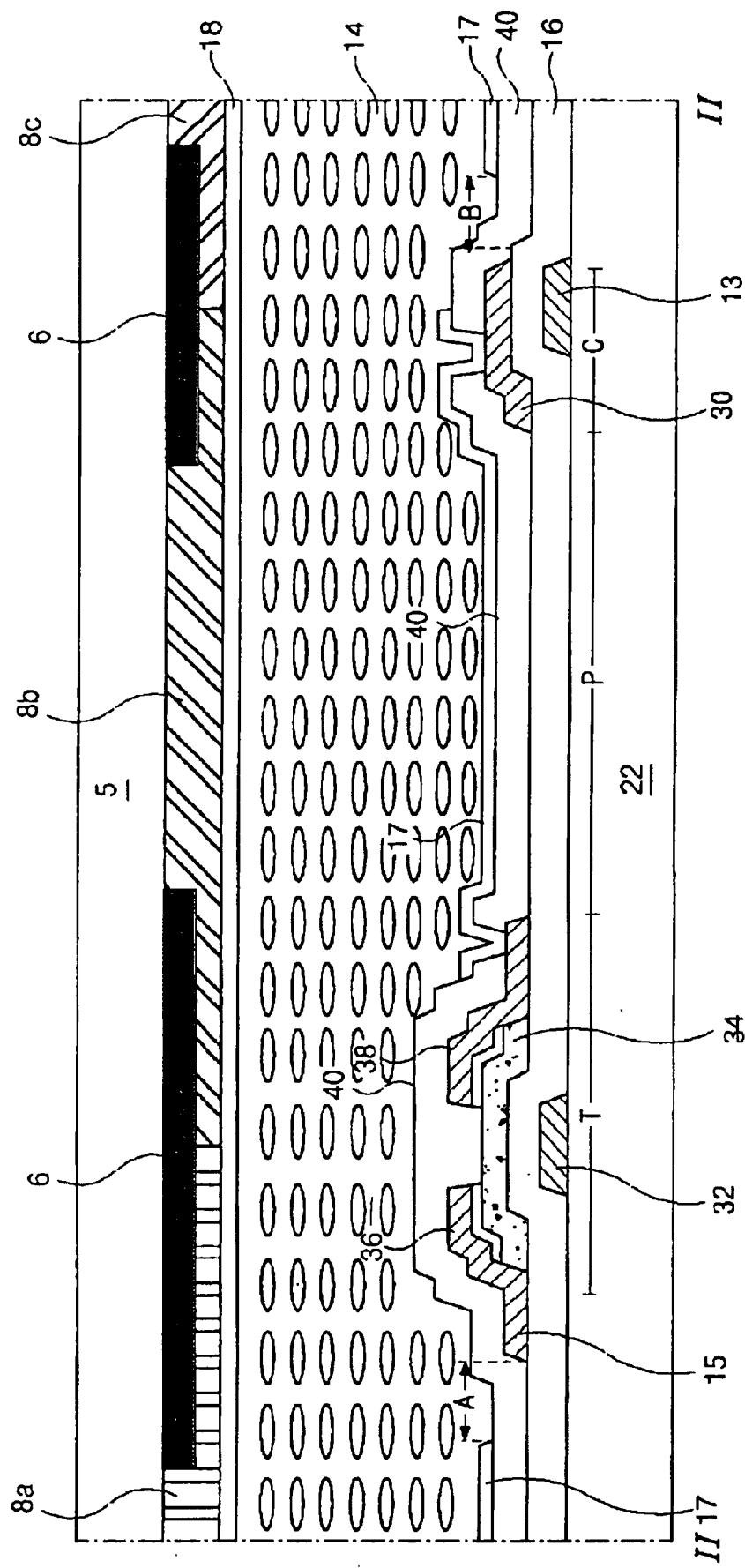
FIG. 2 shows a schematic cross-sectional view taken along line II—II of FIG. 1, illustrating a pixel of the related art liquid crystal display device.
Figure 3:
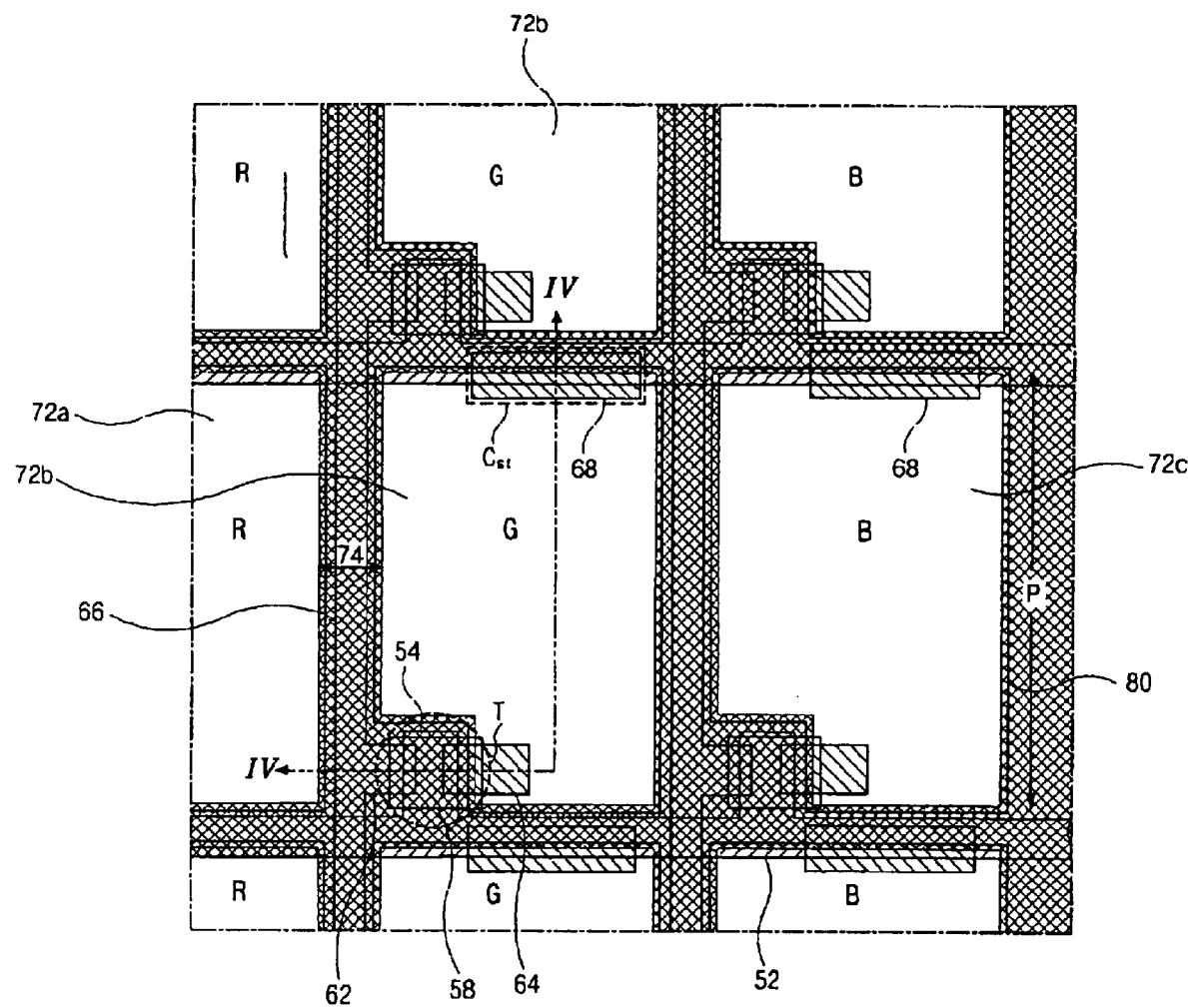
FIG. 3 shows a partially enlarged plane view of a related art array substrate having a color filter on a thin film transistor (COT) structure.
Figure 4A:
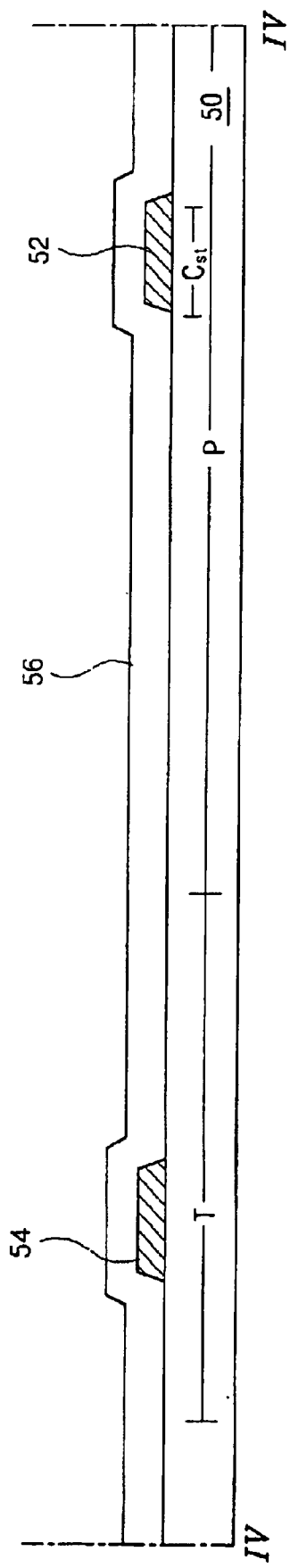
FIGS. 4A to 4G show cross-sectional views taken along a line IV—IV of FIG. 3, illustrating the process steps of fabricating the related art array substrate having a color filter on a thin film transistor (COT) structure.
Figure 4B:
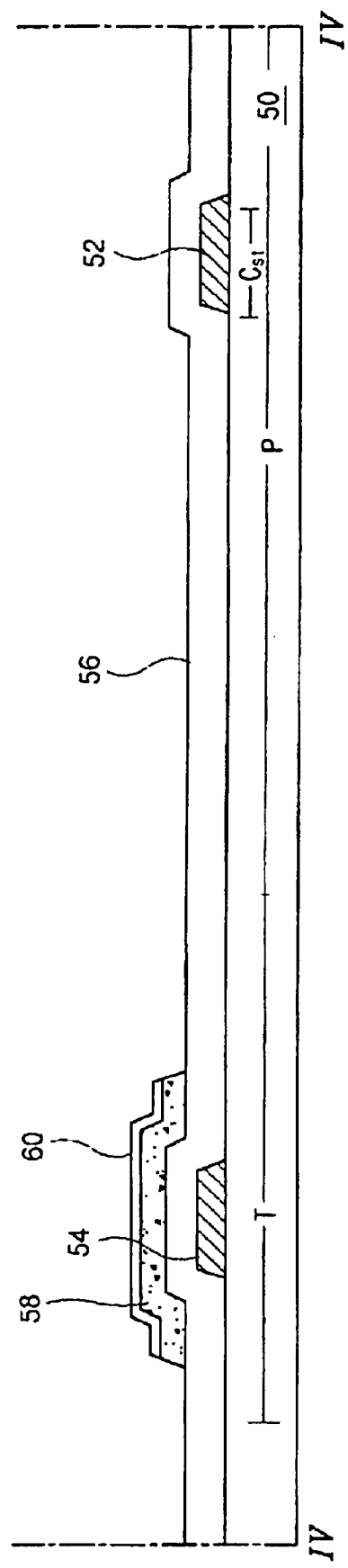
Figure 4C:
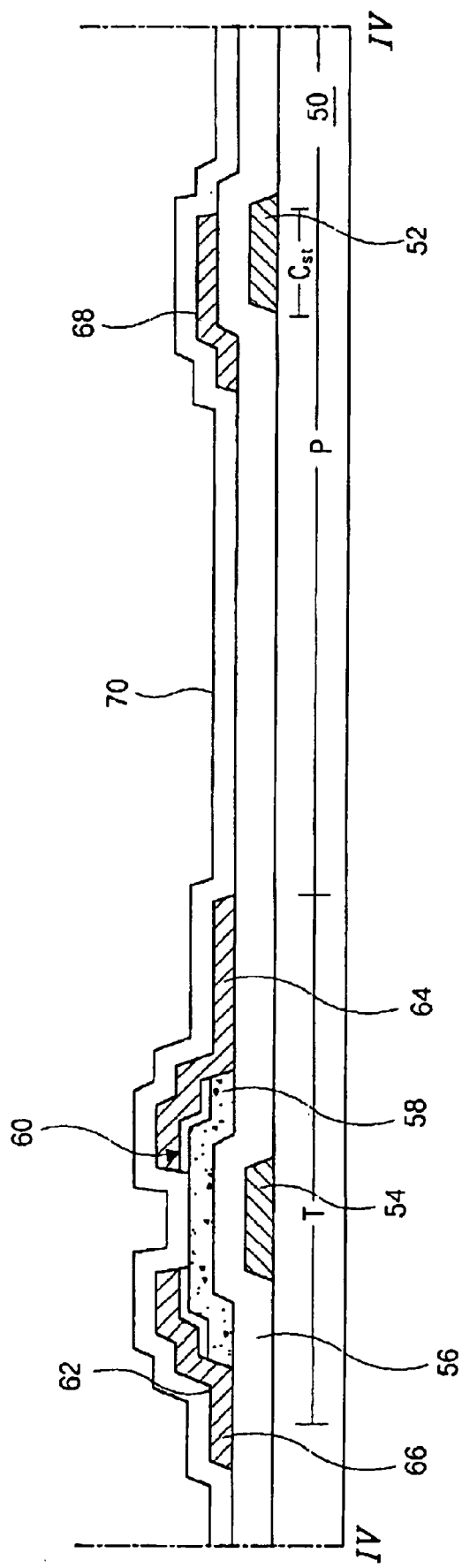
Figure 4D:
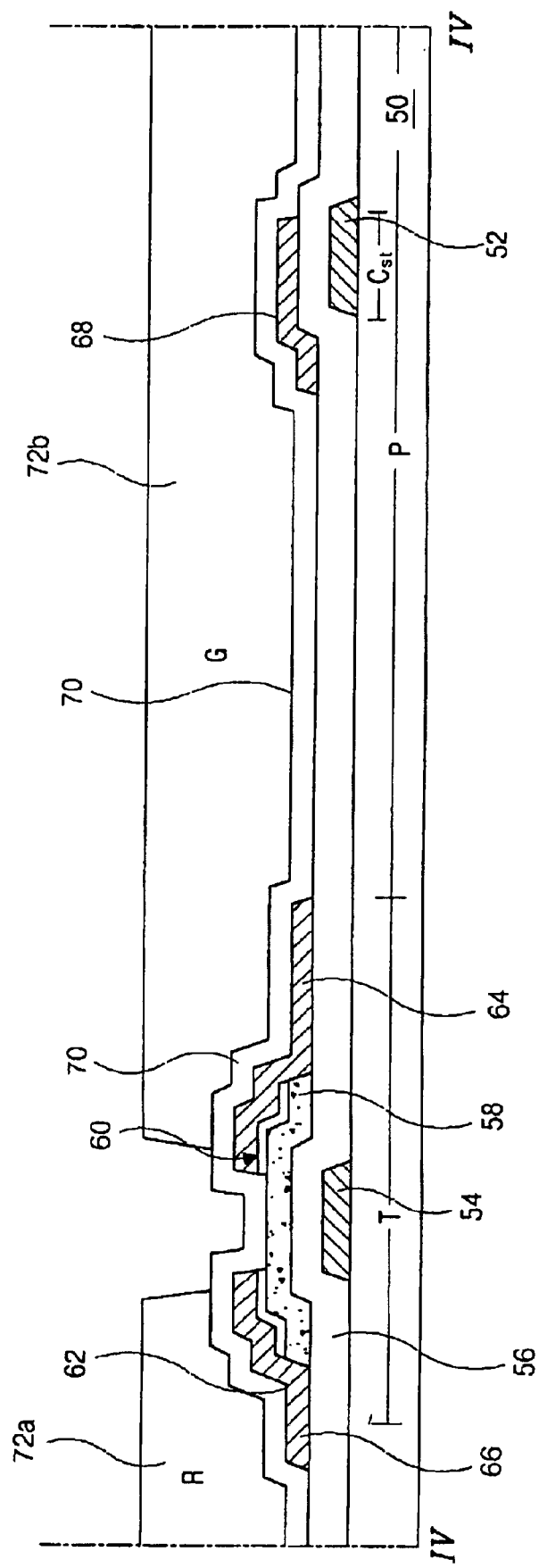
Figure 4E:
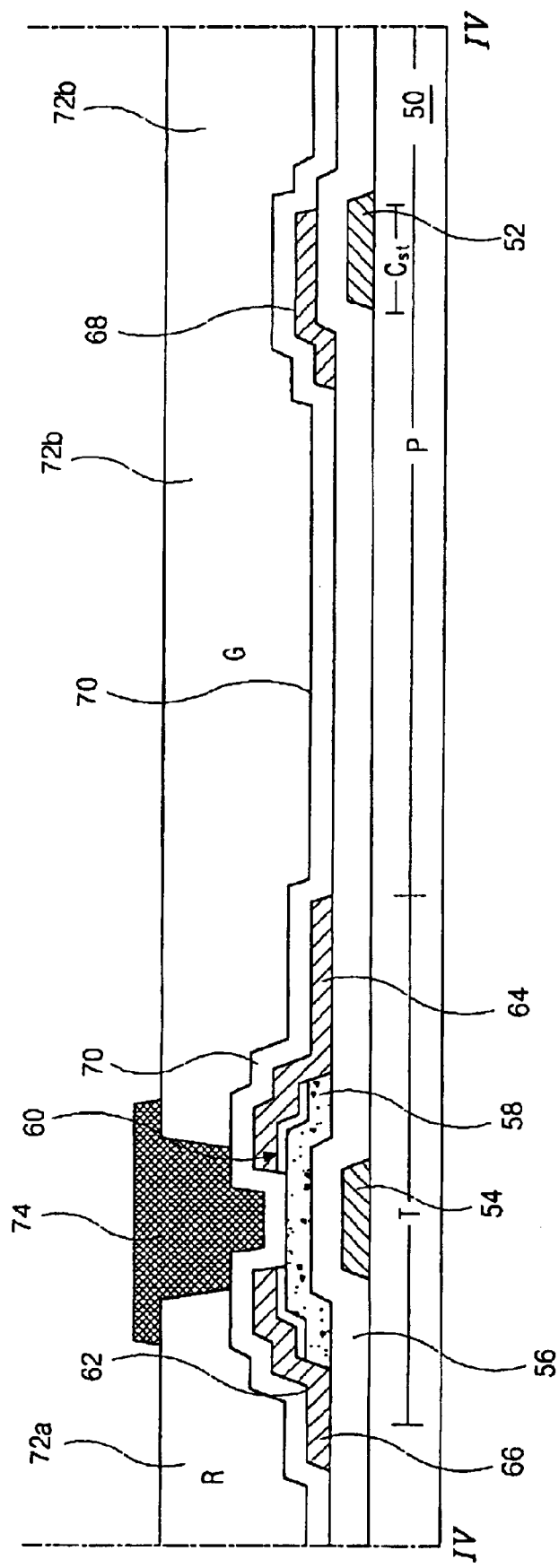
Figure 4F:
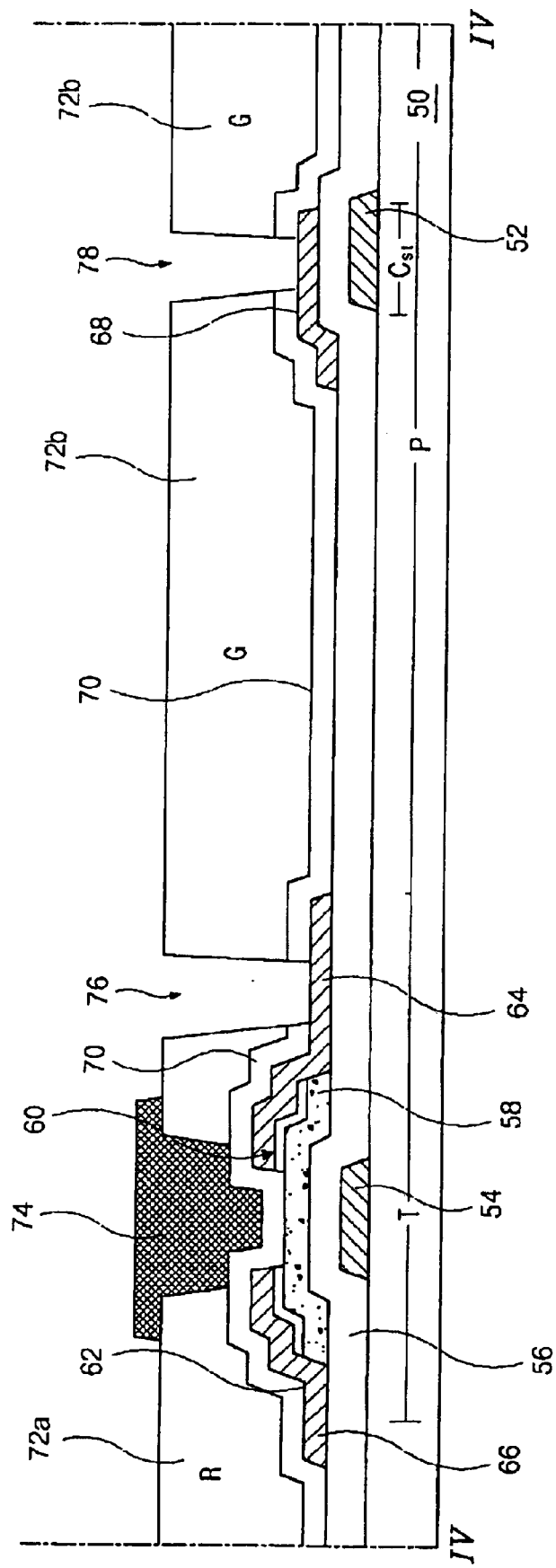
Figure 4G:
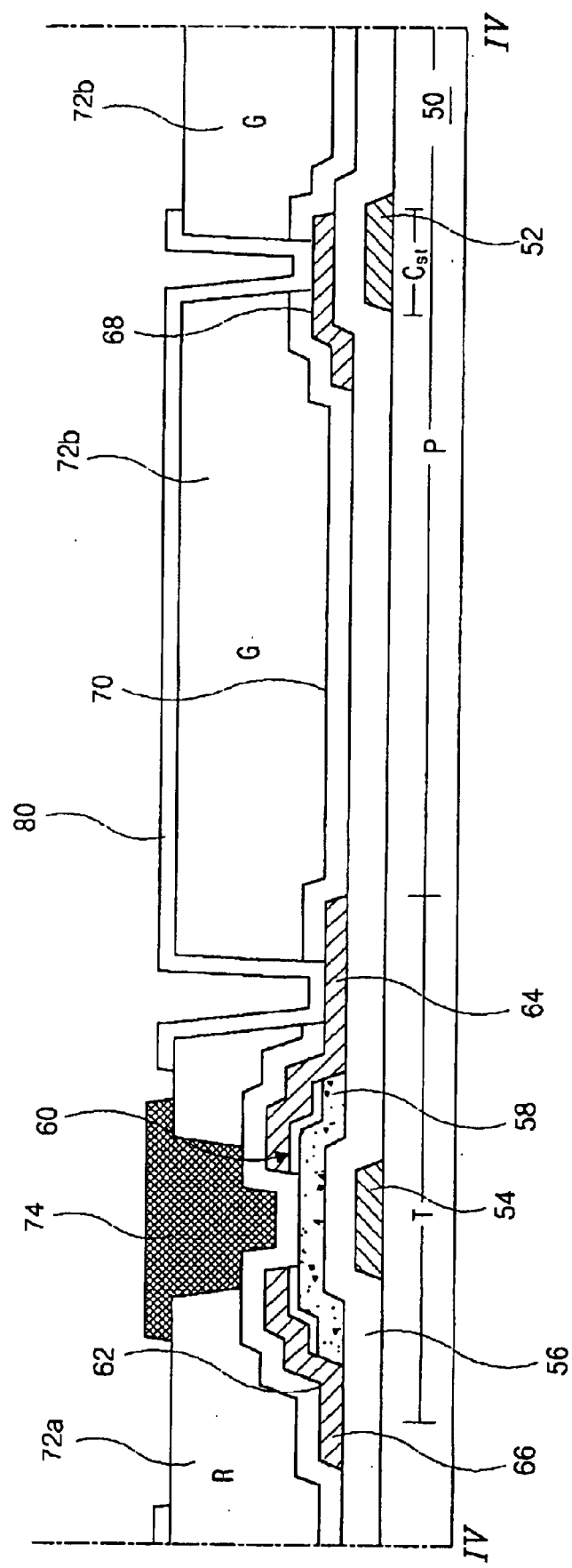
Figure 6A:
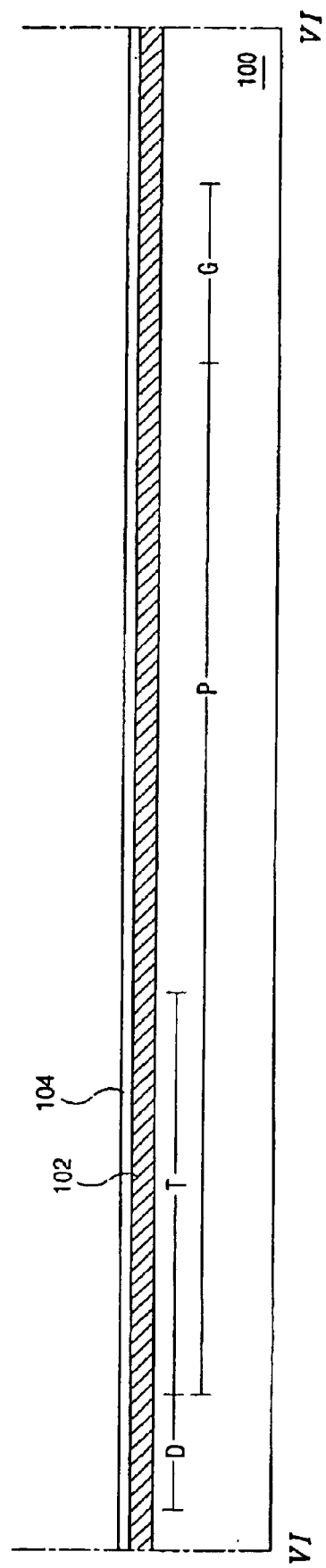
FIGS. 6A to 6F show cross-sectional views taken along a line VI—VI of FIG. 5, illustrating the process steps of fabricating the array substrate having a color filter on a thin film transistor (COT) structure according to the first embodiment of the invention.
Figure 6B:
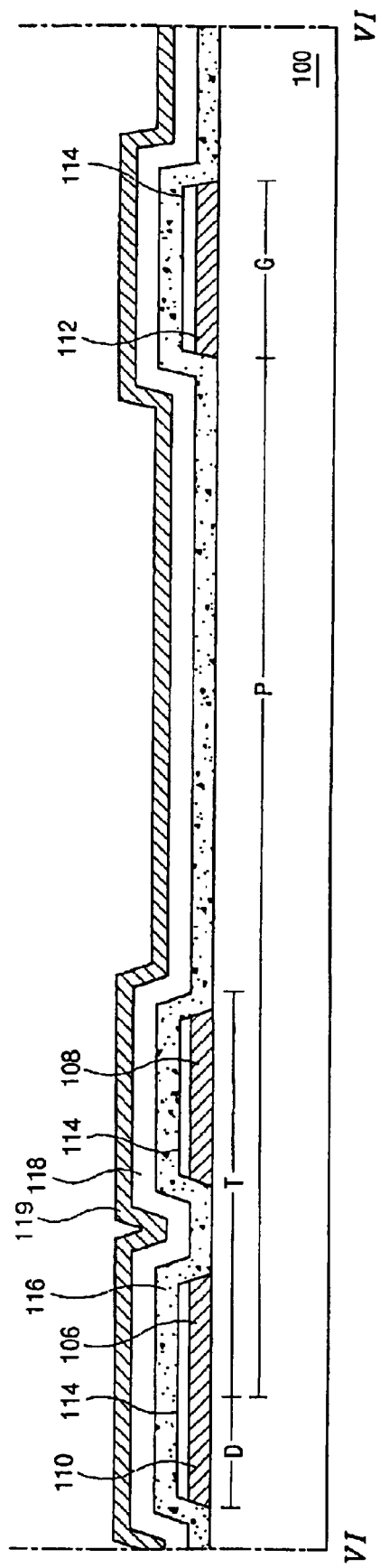
Figure 6C:
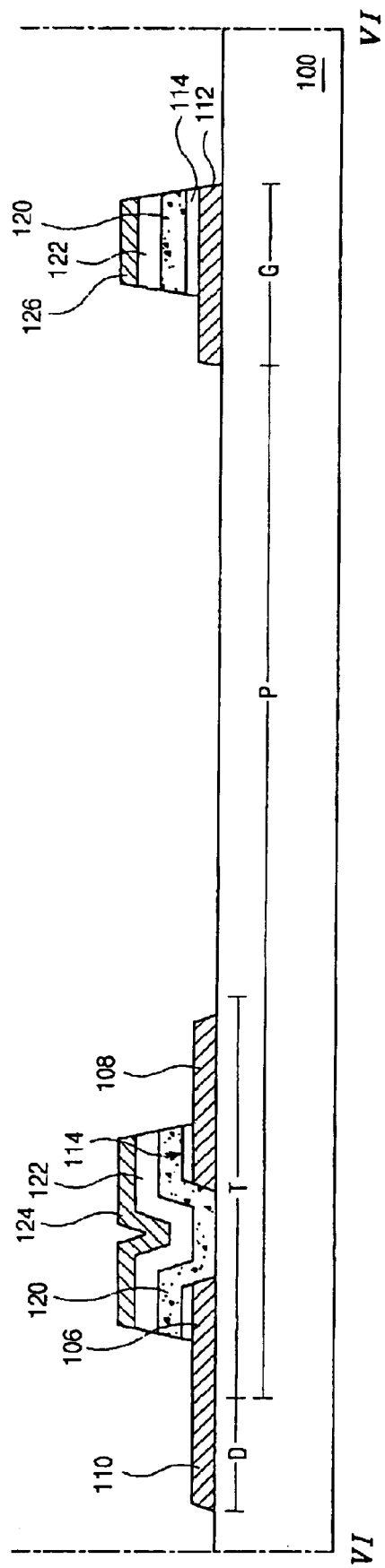
Figure 6D:
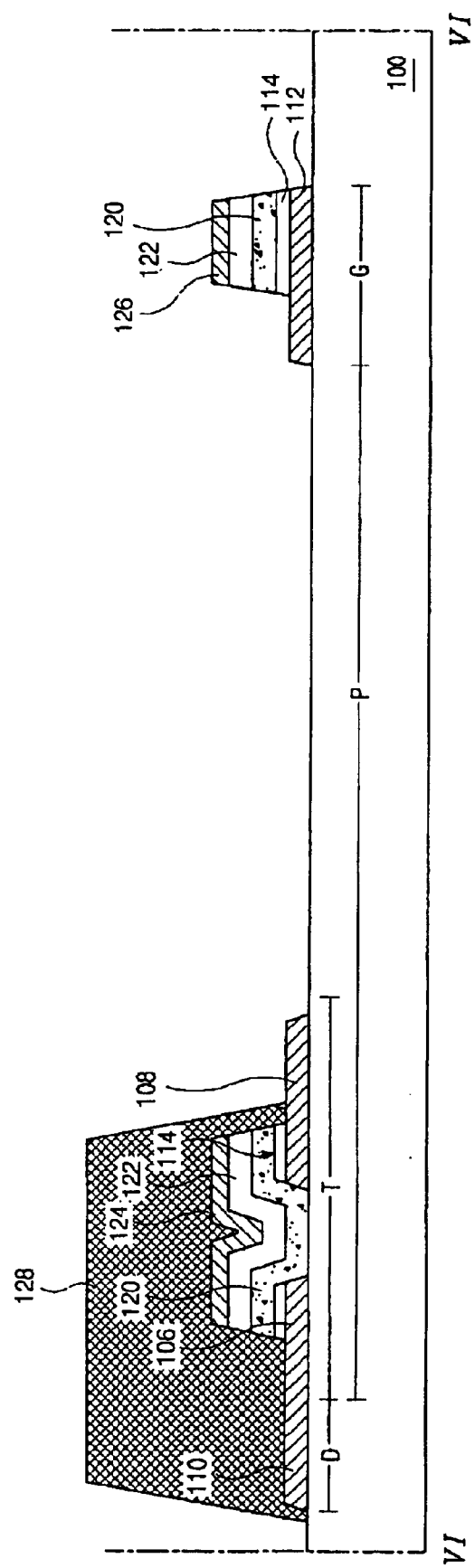
Figure 6E:
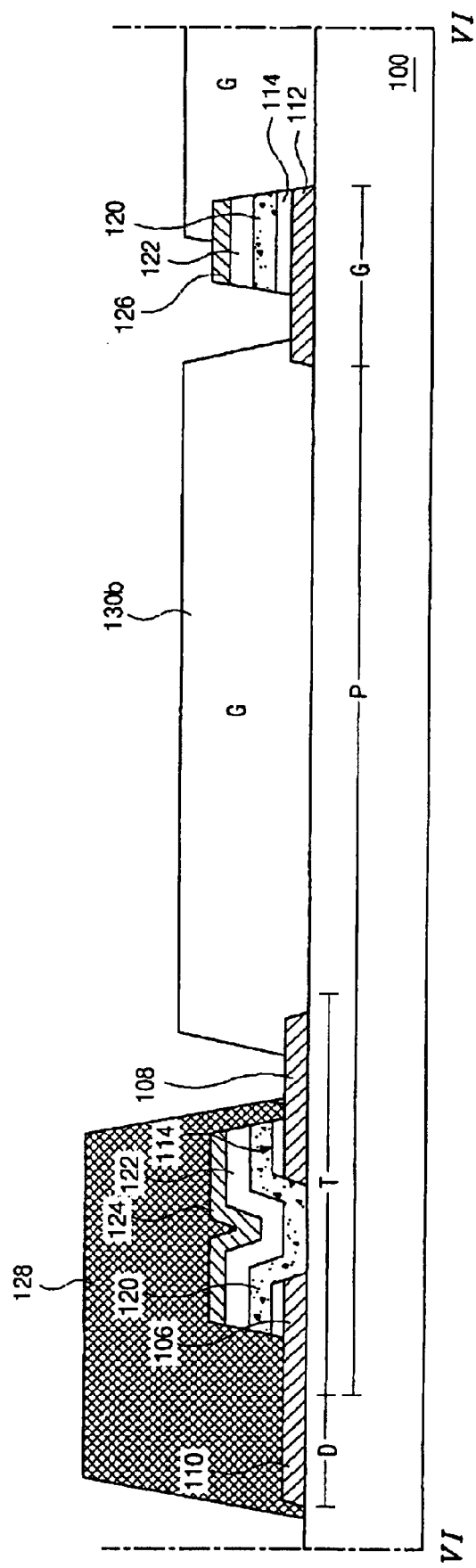
Figure 6F:
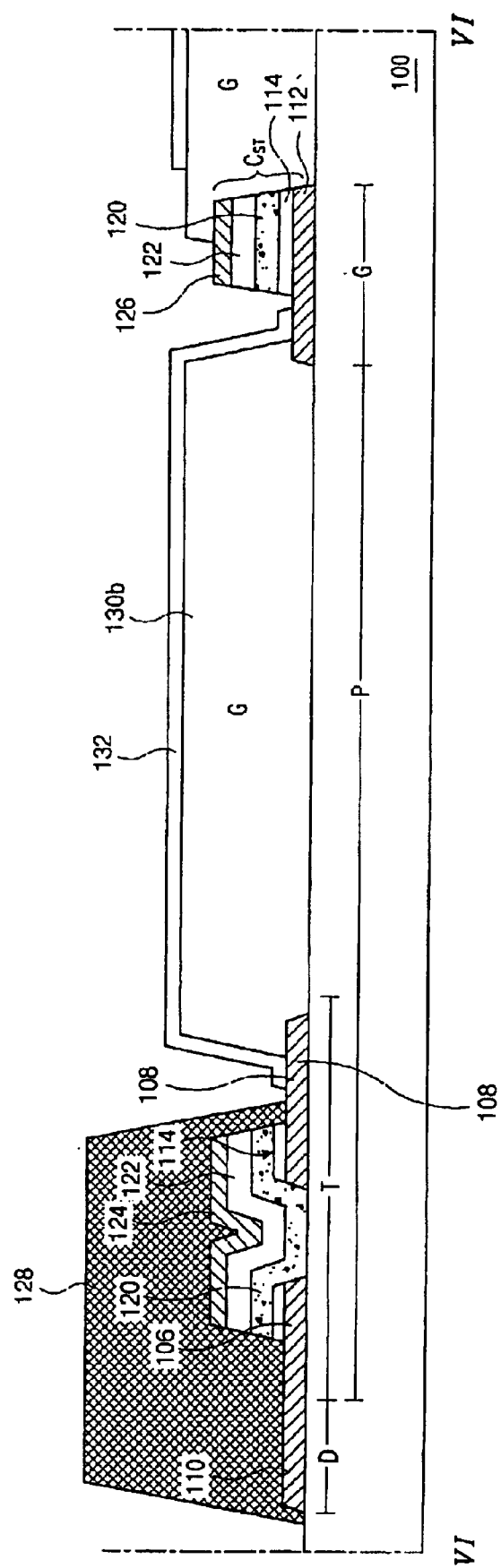

The array substrate of FIG. 3 has a black matrix 128 and the color filters 136 that are formed over a substrate (reference number 100 of FIG. 6F). The black matrix 128 corresponds to the thin film transistors T and the data lines 110, so that it prevents light leakage in the LCD device. The black matrix 128 may be formed of a black organic material and/or an opaque metallic material, thereby blocking the light incident to the thin film transistors T. Also, it protects the thin film transistors T from any external impact. Additionally, the black matrix 128 can be disposed under or above the thin film transistor T, or on the opposite substrate.

FIGS. 6A to 6F show cross-sectional views taken along a line VI—VI of FIG. 5, illustrating the process steps of fabricating the array substrate having a color filter on a thin film transistor (COT) structure according to the first embodiment of the invention.

FIG. 6A shows a data region D, a pixel region P, a TFT region T and a gate region G that are defined in a substrate 100. Thereafter, a first metal layer 102 and an n⁺-doped amorphous silicon layer (n⁺a-Si:H) 104 are sequentially formed on the substrate that has the data region D, the pixel region P, the TFT region T and the gate region G. The material for the first metal layer 102 may be, but are not restricted to, at least one of chromium (Cr), molybdenum (Mo), tungsten (W), titanium (Ti), copper (Cu), aluminum (Al) or an aluminum alloy (e.g., aluminum neodymium (AlNd)).

Next in FIG. 6B, both the first metal layer 102 and the n⁺-doped amorphous silicon layer 104 are simultaneously etched through a first mask process by a dry etch such as plasma etch or reactive ion etch (RIE). Thus, a source electrode 106 and a drain electrode 108 are formed to both correspond to the position of the TFT region T. Furthermore, a data line 110 is formed to correspond to the data region D, and a storage metal layer 112 is formed to correspond to the gate region G next to the pixel region P. As shown in FIG. 5, the data line 110 extends in one direction and the source electrode 106 extends from the data line 110. The drain electrode 108 is spaced apart from the source electrode 106. The storage metal layer 112 has an island shape isolated from the data line 110 and the source and drain electrodes 106 and 108. Meanwhile, doped amorphous silicon patterns 114 are formed on the metal patterns 106, 108, 110 and 112. The doped amorphous silicon patterns 114 disposed on the source and drain electrodes 106 and 108 will become ohmic contact layers in the thin film transistor.

After patterning the first metal layer and the doped amorphous silicon layer, a pure amorphous silicon layer 116, an insulation layer 118 and a second metal layer 119 are formed on the substrate 110 to cover the doped amorphous silicon patterns 114 and metal patterns 106, 108, 110 and 112.

Thereafter, as shown in FIG. 6C, all of the pure amorphous silicon layer 116, the insulation layer 118 and the second metal layer 119 are patterned through a second mask process, thereby forming an amorphous silicon pattern 120 on portions of the source and drain electrodes 106 and 108, a gate insulating layer 122 on the amorphous silicon pattern 120, and a gate electrode 124 on the gate insulating layer 122. The amorphous silicon pattern 120 in the TFT region T is used as an active layer. Those patterns 120 and 122 of the amorphous silicon and insulation are also formed in the gate region G above the storage metal layer 112. Moreover, the gate line 126 corresponds to the gate region G, and perpendicularly crosses the data line 110, as shown in FIG. 5. When forming the amorphous silicon pattern 120, the insulation 122 and the gate line 126 in the gate region, it is important that a portion of the storage metal layer 112 is exposed. Namely, the gate line 126 partially overlaps the storage metal layer 112.

FIG. 6D shows a process step of forming a black matrix. A photosensitive black resin coats the entire of the substrate 100 to cover the elements formed in the previous steps, and then a third mask process patterns the resin. A black matrix 128 thus forms both over the source and drain electrodes 106 and 108 and over the data line 110. At this time, however, it is important that the black matrix 128 does not totally cover the drain electrode 108 but exposes a portion of the drain electrode 108. Furthermore, the black matrix 128 can overlap the gate line 126, but when the color filters formed in the up-and-down neighboring pixels in the later steps have the same color continuously, i.e., when the color filter layer is a stripe type, the black matrix 128 has no requirement to be formed on the gate line 126.

FIG. 6E shows that after forming the black matrix 128, a colored resin is coated over the entire substrate 100 and then developed through a fourth mask process to form color filters 130 having red (R), green (G), and blue (B) colors. As shown in FIGS. 5 and 6E, the color filters 130 alternately includes the red (R) color filter 130a, the green (G) color filter 130b, and the blue (B) color filter 130c. An important aspect of the invention arises from the color filters 130a, 130b, and 130c displaying the full spectrum of colors that are formed within the pixel regions P and each exposed portion of the drain electrode 108 and storage metal layer 112 in each pixel region P. The color filter layer 130 of FIG. 6E shows a stripe type filter.

FIG. 6F shows the step of forming a pixel electrode 132. A transparent conductive material such as indium tin oxide (ITO) or indium zinc oxide (IZO) is deposited over the entire surface of the substrate 100 to cover the patterned black matrix 128 and the color filters 130. Thereafter, a fifth mask process patterns the transparent conductive material to form the pixel electrode 132 on each color filter 130. As shown in FIG. 6F, the pixel electrode 132 is disposed within the pixel region P and contacts both the exposed portion of the drain electrode 108 and the exposed portion of the storage metal layer 112. Therefore, the pixel electrode 132 receives an image signal from the thin film transistor T and is electrically connected with the storage capacitor $C_{ST}$. As described before, the thin film transistor T is the top gate type that includes the source and drain electrodes 106 and 108 at the bottom, the ohmic contact and active layers 114 and 120 in the middle, and the gate electrode 124 at the top. Also, the storage capacitor $C_{ST}$ includes the storage metal layer 112 as a first electrode, the gate line 126 as a second electrode and the interposed insulation pattern 122 as a dielectric layer.

Figure 7:
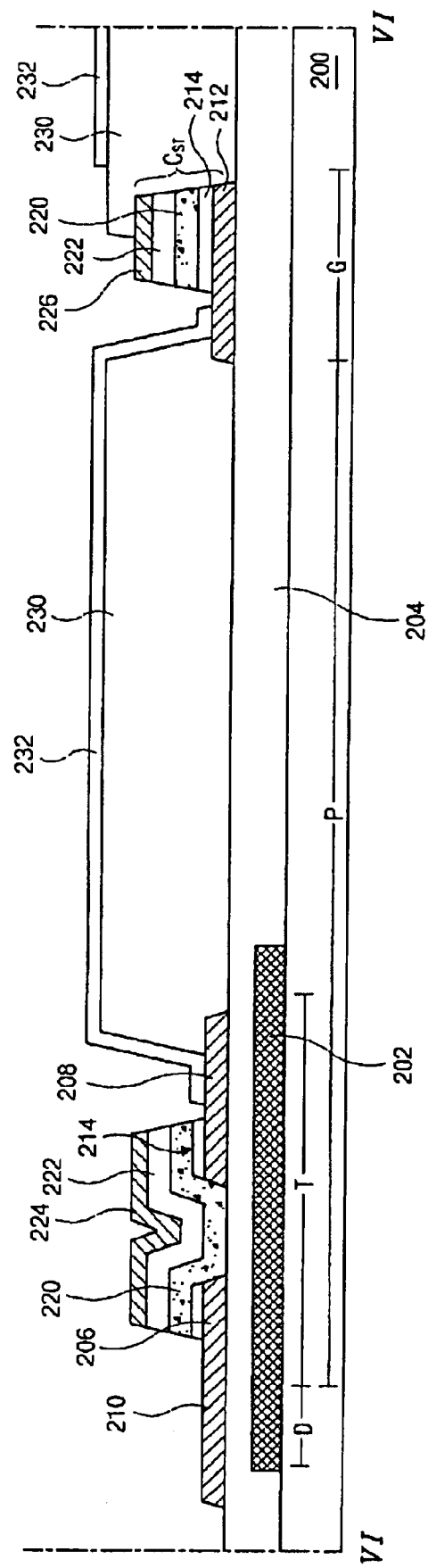
FIG. 7 shows a partially enlarged cross-sectional view of an array substrate having a color filter on a thin film transistor structure according to a second embodiment of the invention.

In the first embodiment shown in FIG. 5 and FIGS. 6A–6F, the black matrix 128 is formed over the thin film transistor T, but it can also be formed underneath the thin film transistor T. FIG. 7 shows a partially enlarged cross-sectional view of an array substrate having a color filter on a thin film transistor structure according to a second embodiment of the invention. The structure and configuration of FIG. 7 are very similar to those of FIG. 6, but positions the black matrix differently.

FIG. 7 shows a substrate 200 that includes a data region D, a TFT region T, a gate region G and a pixel region P therein. Then, a black matrix 202 is formed on the substrate 200 with a correspondence in position to the data region D and TFT region T. The black matrix 202 is formed by way of depositing and patterning chromium (Cr) or a double layer of chromium (Cr) and chromium oxide ($CrO_x$). The material of the black matrix is not restricted to chromium and its oxide, and any suitable material can be used. Thereafter, a buffer layer 204 is formed on the entire substrate 200 to cover the black matrix 202. An organic material forms the buffer layer 204, and this organic material can include, but is not restricted to, benzocyclobutene (BCB), acrylic resin, methacrylic resin, or phenolic resin. Alternatively, an inorganic material can be used, such as silicon nitride ($SiN_x$), silicon oxide ($SiO_2$) or silicon oxynitride ($SiO_xN_y$).

Thereafter, a thin film transistor, a storage capacitor, data and gate lines, a color filter layer and a pixel electrode are formed through the manufacturing process described in FIGS. 6A–6C. The structure and configuration of these elements are the same as the first embodiment described in FIG. 6C. Namely, the thin film transistor includes source and drain electrodes 206 and 208, an active layer 220, a gate insulating layer 224 and a gate electrode 224 that is formed to correspond to the TFT region T. A data line 210 is formed to correspond to the data region D and a gate line 226 is formed to correspond to the gate region G. A storage capacitor $C_{ST}$ including the gate line 226, a storage metal layer 212 and an interposed insulator pattern 222 is also formed to correspond to the gate region G. In the storage capacitor $C_{ST}$, the storage metal layer 212 acts as a first electrode and the gate line 226 acts as a second electrode. Within the pixel region P, a color filter 230 having one of red, green and blue colors is disposed. Further within the pixel region P, a pixel electrode 232 is formed on the color filter 230 and then contacts both the drain electrode 208 and the storage metal layer 212.

The array substrate of the second embodiment described in FIG. 7 is formed through five mask processes, similar to the first embodiment.

Figure 8:
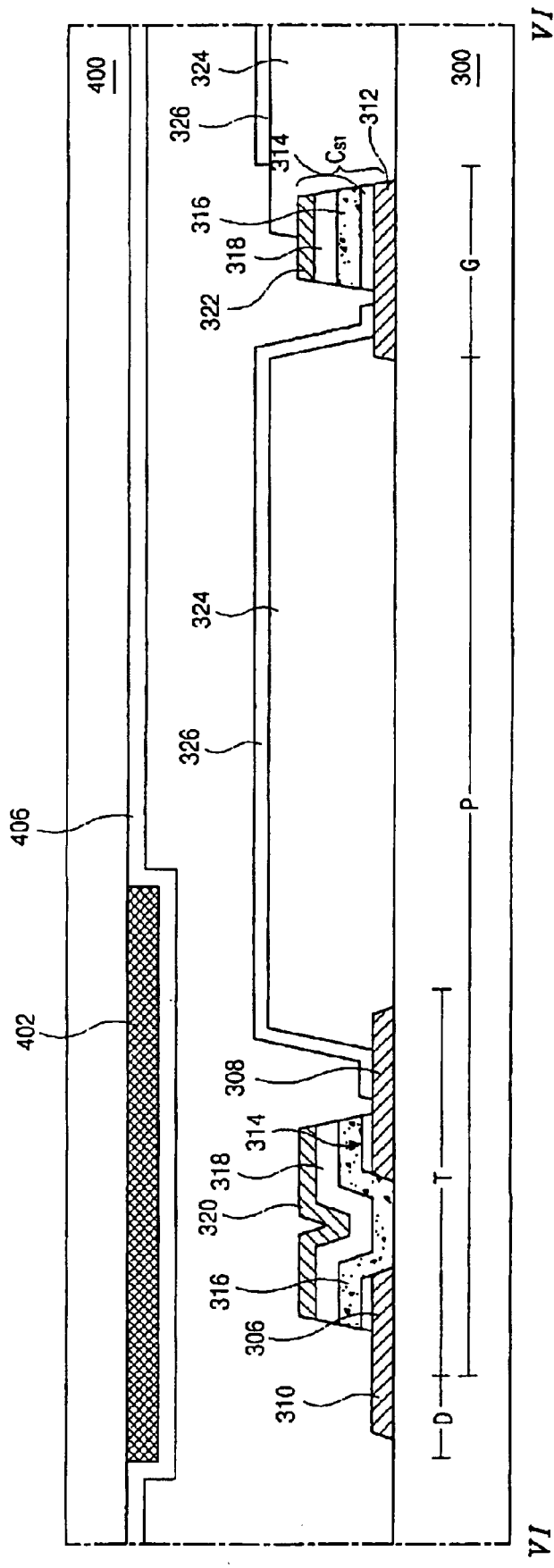
FIG. 8 shows a partially enlarged cross-sectional view of a liquid crystal display device having a color filter on a thin film transistor structure according to a third embodiment of the invention.

FIG. 8 shows a partially enlarged cross-sectional view of a liquid crystal display device having a color filter on a thin film transistor structure according to a third embodiment of the invention. Here, the black matrix is disposed on another substrate opposite to the array substrate. The structure and configuration of the array substrate of the third embodiment is the same as that of the first embodiment of FIG. 6C.

A first substrate 300 and a second substrate 400 are disposed spaced apart from each other. Like the first embodiment, a data region D, a TFT region T, a gate region G and a pixel region P are defined in the first substrate 300. Then, a thin transistor T, a storage capacitor $C_{ST}$, data and gate lines 310 and 322, a color filter layer 324 and a pixel electrode 326 are formed on the first substrate 300 through a manufacturing process described in FIGS. 6A–6C. With respect to the array substrate of FIG. 8, the structure and configuration of these elements are the same as the first embodiment described in FIG. 6C. Namely, the thin film transistor includes source and drain electrodes 306 and 308, an ohmic contact layer 314, an active layer 316, a gate insulating layer 318 and a gate electrode 320 that are formed to correspond to the TFT region T. A data line 310 corresponds to the data region D, and a gate line 322 is formed to correspond to the gate region G. A storage capacitor $C_{ST}$ including the gate line 322, a storage metal layer 312 and an interposed insulator pattern 318 is also formed to correspond to the gate region G. In the storage capacitor $C_{ST}$, the storage metal layer 312 acts as a first electrode and the gate line 322 acts as a second electrode. Within the pixel region P, a color filter 324 having one of red, green or blue colors is disposed. Further within the pixel region P, a pixel electrode 326 is formed on the color filter 324 and then contacts both the drain electrode 308 and the storage metal layer 312.

On the second substrate 400, a black matrix 402 is formed in a position corresponding to the thin film transistor T and the data line 310. Then, a common electrode 406 is formed on the second substrate 400 to cover the black matrix 402. In the third embodiment, the black matrix 402 is formed on the second substrate 400 while a color filter 324 is formed over the first substrate 300.

In the invention, the array substrate of the third embodiment described in FIG. 8 has the black matrix on the second substrate 400, and the array substrate can therefore be manufactured through a simplified manufacturing process. Namely, the array substrate of the third embodiment is formed through the four mask processes, unlike the first and second embodiment.

As mentioned hereinbefore, the invention reduces the process steps of manufacturing the array substrate. Since the color filter does not have any contact hole through which the pixel electrode electrically contacts the thin film transistor or the storage capacitor, the process defects can be reduced during the manufacturing process. Furthermore, formation of the thin film transistor T and the color filter layer on the same substrate increases the aperture ratio of the liquid crystal display. Because the top gate type thin film transistor is employed in the invention, it is possible to simultaneously pattern several layers. Thus, a decrease of the number of process steps is achieved, and the cost of production decreases. Furthermore, when the black matrix is formed in the array substrate, it is not necessary to utilize an aligning margin when designing and aligning the lower and upper substrates, thereby dramatically increasing an aperture ratio.

It will be apparent to those skilled in the art that various modifications and variations can be made in the method for fabricating the array substrate having a color filter on a thin film transistor structure for the liquid crystal display device of the invention without departing from the spirit or scope of the inventions. Thus, it is intended that the invention covers the modifications and variations of this invention provided they come within the scope of the appended claims and their equivalents.

What is claimed is:

1. An array substrate for a liquid crystal display device, comprising:
    a substrate;
        a data line over the substrate in a first direction;
        a gate line over the substrate in a second direction perpendicular to the data line, so that the data and gate lines cross to each other to define a pixel region;
    a thin film transistor disposed near a crossing of the data and gate lines, the thin film transistor comprising:
        source and drain electrodes over the substrate;
        an active layer over the source and drain electrodes;
        an ohmic contact layer between the active layer and the source electrode and between the active layer and the drain electrode;
        a gate insulation layer over the active layer; and
        a gate electrode over the gate insulation layer;
    a black matrix over the thin film transistor and over the data line, the black matrix exposing a portion of the drain electrode;
    a color filter disposed over the substrate within the pixel region, the color filter covering a portion of the drain electrode and exposing another portion of the drain electrode; and
    a pixel electrode over the color filter within the pixel region, the pixel electrode contacting an exposed portion of the drain electrode.

2. The array substrate of claim 1, further comprising:
    a storage capacitor that includes a storage metal layer, a portion of the gate line, and an insulating pattern interposed between the storage metal layer and the gate line; and
    doped and pure amorphous silicon patterns between the storage metal layer and the insulating pattern;
    wherein the pixel electrode electrically contacts a portion of the storage metal layer.

3. The array substrate of claim 2, wherein the data line, the source electrode, the drain electrode and the storage metal layer are formed during the same mask process using identical material selected from the group consisting of chromium (Cr), molybdenum (Mo), tungsten (W), titanium (Ti), copper (Cu), aluminum (Al) and an aluminum alloy.

4. The array substrate of claim 2, wherein the gate insulation layer and the insulating pattern are formed of identical material selected from the group consisting of silicon nitride, silicon oxide and silicon oxynitride.

5. The array substrate of claim 1, wherein the color filter has one of red, green or blue colors and has a continuous color formation with next color filters formed in up-and-down directions.

6. An array substrate for a liquid crystal display device, comprising:
    a substrate including a data region, a TFT region, a pixel region and a gate region;
    a black matrix over the substrate corresponding to the data region and the TFT region;
    a buffer layer over the substrate to cover the black matrix;
    a data line over the buffer layer in a first direction, the data line corresponding to the data region;
    a gate line over the buffer layer corresponding to the gate region in a second direction perpendicular to the data line, wherein the data and gate lines cross to each other, thereby defining the pixel region;
    a thin film transistor disposed over the buffer layer near a crossing of the data and gate lines, the thin film transistor corresponding to the TFT region and comprising:
        source and drain electrodes over the buffer layer;
        an active layer over the source and drain electrodes;
        an ohmic contact layer between the active layer and the source electrode and between the active layer and the drain electrode;
        a gate insulation layer over the active layer; and a gate electrode over the gate insulation layer;

a color filter disposed over the buffer layer within the pixel region, the color filter covering a portion of the drain electrode while exposing another portion of the drain electrode; and a pixel electrode over the color filter within the pixel region, the pixel electrode contacting an exposed portion of the drain electrode.

7. The array substrate of claim 6, further comprising:

a storage capacitor that includes a storage metal layer, a portion of the gate line, and an insulating pattern interposed between the storage metal layer and the gate line; and doped and pure amorphous silicon patterns between the storage metal layer and the insulating pattern;

wherein the pixel electrode electrically contacts a portion of the storage metal layer.

8. The array substrate of claim 7, wherein the data line, the source electrode, the drain electrode and the storage metal layer are formed in the same mask process using identical material selected from the group consisting of chromium (Cr), molybdenum (Mo), tungsten (W), titanium (Ti), copper (Cu), aluminum (Al) and an aluminum alloy.

9. The array substrate of claim 7, wherein the gate insulation layer and the insulating pattern are formed of identical material selected from the group consisting of silicon nitride, silicon oxide and silicon oxynitride.

10. The array substrate of claim 6, wherein the color filter has one of red, green or blue colors and has a continuous color formation with next color filters formed in up-and-down directions.

11. The array substrate of claim 6, wherein the buffer layer comprises at least one material selected from the group consisting of silicon nitride, silicon oxide and silicon oxynitride.

12. A method of fabricating an array substrate for a liquid crystal display device, comprising:

forming a first metal layer and a doped amorphous silicon layer in series over a substrate;

patterning the first metal layer and the doped amorphous silicon layer simultaneously to form a data line, a source electrode and a drain electrode;

forming a pure amorphous silicon layer, an insulating layer and a second metal layer in series over the substrate to cover the data line, the source electrode and the drain electrode;

patterning the pure amorphous silicon layer, the insulating layer and the second metal layer simultaneously to form an active layer, a gate insulation layer, a gate electrode and a gate line, thereby forming a thin film transistor comprising the source and drain electrode, the active layer and the gate electrode, wherein the gate line perpendicularly crosses the data line to form a pixel region;

forming a black matrix over the thin film transistor and on the data line, except for a portion of the drain electrode;

forming a color filter over the substrate within the pixel region, the color filter covering a portion of the drain electrode with exposing another portion of the drain electrode; and forming a pixel electrode over the color filter within the pixel region, the pixel electrode contacting an exposed portion of the drain electrode.

13. The method of claim 12, wherein patterning the first metal layer and the doped amorphous silicon layer forms a storage metal layer over the substrate.

14. The method of claim 13, wherein patterning the pure amorphous silicon layer, the insulating layer and the second metal layer forms a doped amorphous silicon pattern, a pure amorphous silicon pattern and an insulating pattern in series between the storage metal layer and the gate line.

15. The method of claim 14, wherein the storage metal layer, a portion of the gate line and the insulation pattern comprise a storage capacitor.

16. The method of claim 13, wherein the pixel electrode electrically contacts a portion of the storage metal layer.

17. The method of claim 12, wherein the first metal layer comprises at least one metallic material selected from the group consisting of chromium (Cr), molybdenum (Mo), tungsten (W), titanium (Ti), copper (Cu), aluminum (Al) and an aluminum alloy.

18. The method of claim 12, wherein the insulation comprises at least one material selected from the group consisting of silicon nitride, silicon oxide and silicon oxynitride.

19. The method of claim 12, wherein the color filter has one of red, green or blue colors and has a continuous color formation with next color filters formed in up-and-down directions.

20. The method of claim 12, wherein the black matrix comprises a photosensitive black resin.

21. A method of fabricating an array substrate for a liquid crystal display device, comprising:

defining a data region, a TFT region, a pixel region and a gate region in a substrate;

forming a black matrix over the substrate corresponding to both the data region and the TFT region;

forming a buffer layer over the substrate to cover the black matrix;

forming a data line over the buffer layer in a first direction, the data line corresponding to the data region;

forming a gate line over the buffer layer to correspond to the gate region in a second direction perpendicular to the data line, wherein the data and gate lines cross each other, thereby defining the pixel region;

forming a thin film transistor over the buffer layer near the crossing of the data and gate lines, the thin film transistor corresponding to the TFT region and comprising:

source and drain electrodes over the buffer layer;

an active layer over the source and drain electrodes;

an ohmic contact layer between the active layer and the source electrode and between the active layer and the drain electrode;

a gate insulation layer over the active layer; and a gate electrode over the gate insulation layer;

forming a color filter over the buffer layer within the pixel region, the color filter covering a portion of the drain electrode while exposing another portion of the drain electrode; and forming a pixel electrode over the color filter within a pixel region, the pixel electrode contacting an exposed portion of the drain electrode.

22. The method of claim 21, further comprising forming a storage capacitor that includes a storage metal layer, a portion of the gate line, and an insulating pattern interposed between the storage metal layer and the gate line.

23. The method of claim 22, wherein the pixel electrode electrically contacts a portion of the storage metal layer.

24. The method claim 22, further comprising forming doped and pure amorphous silicon patterns between the storage metal layer and the insulating pattern.

25. The method of claim 22, wherein the data line, the source electrode, the drain electrode and the storage metal layer are formed in the same mask process using identical material selected from the group consisting of chromium (Cr), molybdenum (Mo), tungsten (W), titanium (Ti), copper (Cu), aluminum (Al) and an aluminum alloy.

26. The method of claim 22, wherein the gate insulation layer and the insulating pattern are formed of identical material selected from the group consisting of silicon nitride, silicon oxide and silicon oxynitride.

27. The method of claim 21, wherein the color filter has one of red, green or blue colors and has a continuous color formation with next color filters formed in up-and-down directions.

28. The method of claim 21, wherein the buffer layer comprises at least one material selected from the group consisting of benzocyclobutene (BCB), acrylic resin, methacrylic resin, silicon nitride, silicon oxide and silicon oxynitride.

29. The method of claim 21, the black matrix is one of a single layer of chromium or a double layer of chromium and chromium oxide.

30. A liquid crystal display device, comprising:
   first and second substrates spaced apart from each other;
   a data line over the first substrate in a first direction;
   a gate line over the first substrate in a second direction perpendicular to the data line, so that the data and gate lines cross to each other to define a pixel region;
   a thin film transistor disposed over the first substrate near a crossing of the data and gate lines, the thin film transistor comprising:
   source and drain electrodes over the first substrate;
   an active layer over the source and drain electrodes;
   an ohmic contact layer between the active layer and the source electrode and between the active layer and the drain electrode;
   a gate insulation layer over the active layer; and
   a gate electrode over the gate insulation layer;
   a color filter disposed over the first substrate within the pixel region, the color filter covering a portion of the drain electrode with exposing another portion of the drain electrode;
   a pixel electrode over the color filter within the pixel region, the pixel electrode contacting an exposed portion of the drain electrode;
   a black matrix over the second substrate, the black matrix corresponding to both the data line and the thin film transistor; and
   a common electrode over an entire of the second substrate to cover the black matrix.

* * * * *